L. T. COOPER.
PISTON RING.
APPLICATION FILED JUNE 26, 1917.

1,376,079.

Patented Apr. 26, 1921.

Inventor
Lemuel T. Cooper
By [signature]
Attorney

UNITED STATES PATENT OFFICE.

LEMUEL T. COOPER, OF PHILADELPHIA, PENNSYLVANIA.

PISTON-RING.

1,376,079.     Specification of Letters Patent.     Patented Apr. 26, 1921.

Application filed June 26, 1917. Serial No. 176,952.

*To all whom it may concern:*

Be it known that I, LEMUEL T. COOPER, a citizen of the United States, residing at Philadelphia, in the county of Philadelphia, State of Pennsylvania, have invented a new and useful Piston-Ring, of which the following is a specification.

My invention relates to improvements in piston packing, the object being to provide a piston ring which will be to a maximum degree gas or steam tight and will cause a minimum amount of wear.

Referring to the drawings, which illustrate merely by way of example, a suitable embodiment of my invention;—

Similar numerals refer to similar parts throughout the several views.

Figure 1:
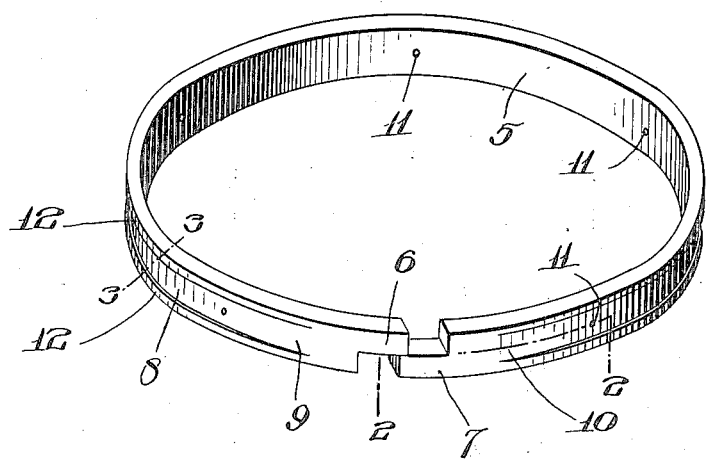
Figure 1 is a view in perspective.
Figure 3:
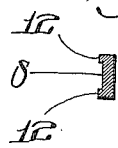
Fig. 3 is a section on line 3, 3 of Fig. 1.
Figure 2:
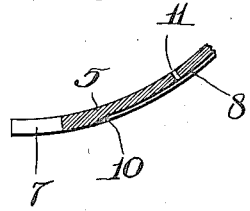
Fig. 2 is a section on line 2, 2 of Fig. 1.

As will be noted the ends of the ring 5 are cut away or recessed thereby providing parallel overlapping tongues 6 and 7 which permit of expansion or contraction without impairing the gas-tight joint between the two.

Around the periphery of the ring I provide a very shallow channel 8 terminating however short of each end of the ring. That is to say, the bottom of the channel inclines upwardly as at 9 and 10 to the peripheral surface of the ring, so that the outer peripheral margins of said tongues 6 and 7 are flush with the peripheral margins of the flanges 12 flanking the channel 8 so as to prevent leak through the joint into the channel 8.

A plurality of radial apertures 11 are provided extending from the channel 8 through the rear face of the ring.

The slight depression or channel 8 extending around the major portion of the ring's periphery and extending across the greater portion of the width of the ring forms the two narrow flanking marginal flanges 12 which alone engage the surrounding cylinder surface with the exception of the flush ends above described. The construction described secures the following advantages.

Whatever gas tends to leak between the ring and the piston or between the ring flange and the cylinder wall may pass through the apertures 11 and thus equalize the pressures on either side of the ring, it being understood that the aggregate area of the apertures 11 relative to the clearance, is such as to secure said pressure equilibrium, and the gas passing into channel 8 will serve as a cushion and lubricant between ring and cylinder wall.

The long overlap permitted by the tongue formations 6 and 7 provides for ample expansion and contraction of the ring without breaking the gas-tight joint between the two. The flush surface formation at the ends of the ring prevents gas from passing the joint or from the recessed portion of the ends into the channel 8, and thus out again through the opposite recessed portion.

The wide shallow channel 8, and the comparatively narrow marginal flanges 12 provide a minimum wearing surface for contacting with the cylinder wall. This affords a much more efficient gas-tight joint between the ring and cylinder wall, and greatly reduces the wear and consequently prolongs the life of the wearing parts.

What I claim is:—

A piston packing comprising a split ring with ends recessed to form an overlapping joint, and provided with a single relatively shallow continuous peripheral channel terminating at points adjacent the two ends, said channel extending across the greater portion of the width of the ring and flanked by comparatively narrow flanges, the peripheral surface of the flanges and of the overlapping ends being flush, said ring also provided with a plurality of apertures extending from the bottom of the channel to the inner surface of the ring, said apertures having such aggregate area, relative to the clearance, as to secure a pressure equilibrium on both sides of the ring.

LEMUEL T. COOPER.